UNITED STATES PATENT OFFICE.

HENRY JACKSON, OF CHICAGO, ILLINOIS, ASSIGNOR OF ONE-HALF TO CHARLES T. BROWN, OF SAME PLACE.

DISINFECTANT.

SPECIFICATION forming part of Letters Patent No. 476,276, dated June 7, 1892.

Application filed September 30, 1891. Serial No. 407,303. (No specimens.)

*To all whom it may concern:*

Be it known that I, HENRY JACKSON, a resident of the city of Chicago, in the county of Cook and State of Illinois, have invented certain new and useful Improvements in a Compound for Disinfecting, Deodorizing, and Germicide Purposes of the kind known in the trade under the name of "Phenyle," of which the following is a clear and exact description.

This compound is composed of the following-named ingredients, combined in the proportions named—that is to say, in producing a given quantity of a disinfecting and deodorizing compound sixty per cent. thereof consists of slaked lime, ten per cent. of sulphate of iron, ten per cent. caustic soda, ten per cent. of crude carbolic acid of twenty-five per cent. strength, and ten per cent. of sodium chloride, the several above-named ingredients being mixed together, making a total of one hundred per cent. To make a combined disinfecting deodorizing germicide, to every two hundred and fifty pounds of the above compound there is added one pound of bichloride of mercury. After the above-named ingredients are thoroughly mixed in the quantities named and the resulting compound dried it is ready for use.

In addition to the above-named purposes for which this compound is especially adapted, it can be used by embalmers as a cheap and powerful assistant for disinfecting the room in which a body has been contained, for maintaining a sweet and healthy condition in and about alleys, cellars, cesspools, and privy-vaults in cities, villages, and towns, and, in fact, for all the purposes for which deodorizers, disinfectants, and germicides are generally used.

While I am aware that some of the herein-above-named ingredients have been combined and used for disinfecting or deodorizing purposes, but not combined in like proportions, nor yet combined with all the ingredients specified, and while these proportions may to some extent be varied, I find that the several ingredients contained in or about the proportions named make a disinfectant, deodorizer, and germicide much more effective in its character than any which have been heretofore made.

When the several ingredients of slaked lime, sulphate of iron, caustic soda, crude carbolic acid, and sodium chloride are combined in about the proportions named, a disinfecting and deodorizing compound will be obtained that will not act as a germicide, and where a germicide is not desired the bichloride of mercury may be omitted.

Having thus described my invention, what I claim, and desire to secure by Letters Patent, is—

1. The within-described compound to be used for disinfecting and deodorizing purposes, the same consisting of slaked lime, sulphate of iron, crude carbolic acid, caustic soda, and sodium chloride substantially in or about the proportions specified.

2. The within-described compound to be used for disinfectant, dedorizer, and germicide purposes, the same consisting of slaked lime, sulphate of iron, crude carbolic acid, caustic soda, sodium chloride, and bichloride of mercury substantially in or about the proportions specified.

HENRY JACKSON.

Witnesses:
FLORA L. BROWN,
CHARLES T. BROWN.